April 30, 1929.   W. S. BOWEN   1,711,306
ART OF SPRAY DRYING
Filed July 1, 1927   2 Sheets-Sheet 2

INVENTOR
WILLIAM SPENCER BOWEN
BY
ATTORNEY

April 30, 1929.  W. S. BOWEN  1,711,306
ART OF SPRAY DRYING
Filed July 1, 1927  2 Sheets-Sheet 1

INVENTOR
WILLIAM SPENCER BOWEN
BY
ATTORNEY

Patented Apr. 30, 1929.

1,711,306

UNITED STATES PATENT OFFICE.

WILLIAM SPENCER BOWEN, OF WESTFIELD, NEW JERSEY.

ART OF SPRAY DRYING.

Application filed July 1, 1927. Serial No. 202,837.

The invention relates to the art of desiccation, more particularly to the recovery of solids from solutions and suspensions or slurries thereof.

The invention has for its object, generally, to improve the desiccating action and more efficiently utilize the heat of the gaseous drying medium employed, thereby not only providing for a better product but effecting economy of operation.

In carrying out the invention, provision is made for subjecting the incoming spray of solid-containing liquid in finely divided or atomized condition to a series of radially disposed jets of the heated gaseous medium, said jets circumscribing the incoming spray and being located entirely below the orifice of the nozzle producing the same. The said spray and circumscribing jets are located at the upper portion of a drying chamber and the dried powder product will be deposited on the bottom thereof from which, in accordance with the invention, it is removed through an opening therein by a novel collecting scraper member rotatable over said bottom and shaped to concentrate the same into an area substantially equal to that of the said opening, discharging the same therethrough, for example, into a suitable valved hopper or the like associated with the bottom of the chamber.

The nature of the invention, however, will best be understood when described in connection with the accompanying drawings, in which.

Figure 2:
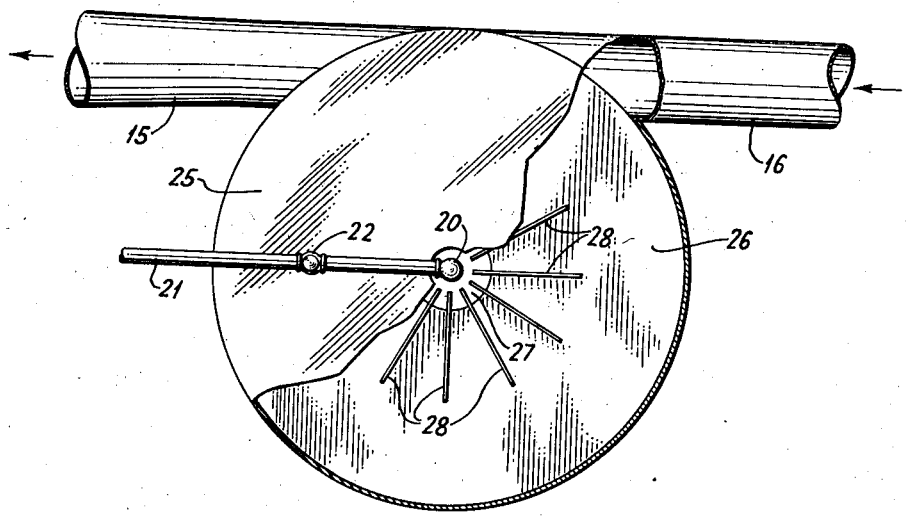
Fig. 2 is a plan view with a portion broken away to disclose the interior.
Figure 3:
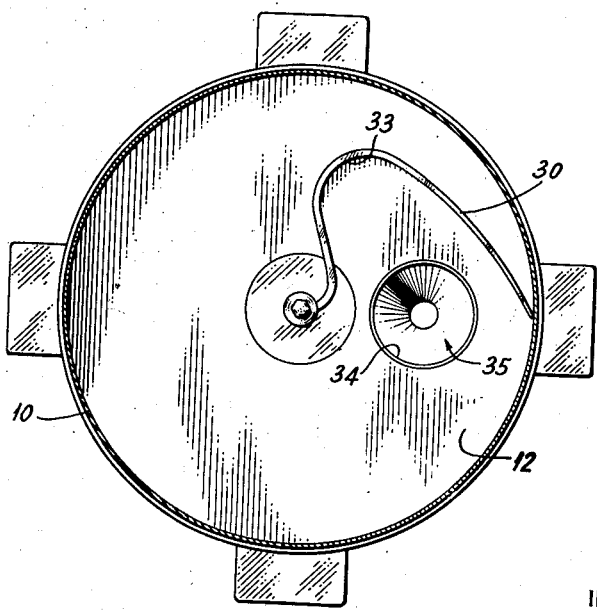
Fig. 3 is a horizontal section taken on the line 3—3, Fig. 1, and looking in the direction of the arrows.
Figure 1:
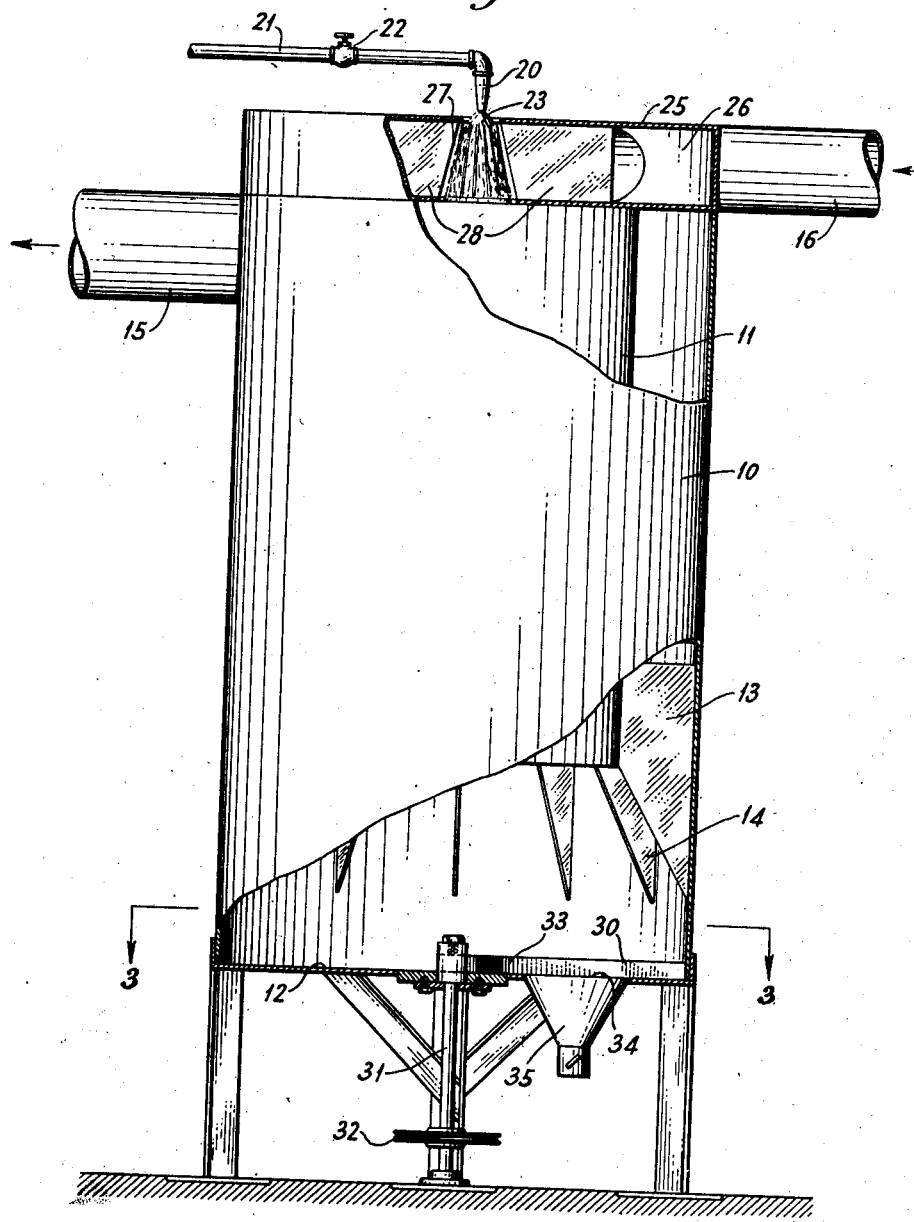
Fig. 1 is a vertical section of the desiccating tower or chamber in which the desiccating action is to be conducted, portions of the tower wall being broken away to disclose the interior.

Referring to the drawings, 10 designates a shell providing a chamber or tower suitably constructed and of capacity to conform with the operations in view. As shown, the tower comprises an inner shell 11 forming a cylindrical chamber extending from the top of the tower toward the bottom 12, the annular space 13 formed between the outer shell 10 and the inner shell 11 constituting an exhaust chamber for the spent effluent gases and such of the fines from the powder product as may be carried therewith. Suitable guide vanes 14 may also be provided at the bottom of the said exhaust chamber 13 for the purpose of evenly distributing the exhaust gases which are conducted therefrom to the space 13 and thence removed from the tower through an exhaust duct 15.

Provision is made to supply the tower 10 at its upper portion with a heated gaseous medium, as air and at a suitable temperature, for example, through a flue or duct 16. An adequate volume of this gaseous medium is to be supplied to the tower and may be provided in any well known manner, either by establishing a pressure thereon or by inducing a flow thereof through suitable exhaust apparatus (not shown)—all of which, however, is well understood and forms no particular part of the present invention.

The invention relates more especially to the manner in which this incoming heated gaseous medium is applied to the incoming spray of the solid-containing liquid to be desiccated. The latter is introduced, generally, axially of the casing 11 through a suitable spray nozzle or like device 20, which latter is connected with a source of supply (not shown) by means of a supply pipe 21 having a controlling valve 22 included therein. Instead of the incoming gaseous medium together with the spray of liquid being directly introduced into the casing 11 as is the ordinary practice, the former is introduced in a plane below the orifice 23 of the spray nozzle and also in manner such that the volume of incoming heated gaseous medium is divided into a plurality of jets which are radially directed toward the spray from said nozzle and circumscribe the same.

To this end, the top of the tower is provided with a distributing casing 25 secured thereon below the orifice of said spray nozzle, and said casing is interrupted to provide a circumferential annular chamber 26 into which the duct or flue 16 discharges. The said casing, furthermore, has an axial opening 27 therethrough for allowing the spray from the spray nozzle to pass; and said opening is preferably expanding or flaring downwardly into the casing 11 to accommodate the usual frusto-conical form of the spray from the spray nozzle. Between this axial opening through the casing 25 and the circumferential chamber 26 is a number of vertical walls or guide vanes 28 which are disposed radially therebetween and the top and bottom of the distributing casing to direct the flow of incoming heated gaseous medium as radial jets toward the said spray proceeding from the spray nozzle orifice 23.

By this means, a series of circumscribing jets of the incoming gaseous medium will be directed radially toward the body of the spray in a plane at right angles to its axis and will thereby most effectively cause its desiccation, heating the same appreciably before the spray expands into the chamber or casing 11. It will be noted that these impinging jets or streams of incoming air lie in a plane below the orifice 23 of the spray nozzle and are directed to the outgoing spray at a fair velocity, so that a material increase in the rate of evaporation, to an extent substantially double that of the usual flow arrangement, is attained. Moreover, by removing the spray nozzle from the blast of hot gases, droplets of spray will not be caused to harden about the orifice 23 which would necessitate frequent removal for cleaning of the same. Fluids within the nozzle and sensitive to heat, furthermore, will not become overheated prior to the breaking-up of the same into spray. The impact of the heated gaseous medium upon the spray particles makes also for an appreciable increase in the rate of evaporation of the liquid therefrom; and due to the converging nature of the gaseous medium passages, they form individual nozzles for increasing the velocity of the flow of said medium and the impact upon the spray particles resulting in a marked effect upon the rate of evaporation as aforesaid; also, in view of the circumscribing nature of these jets, the said medium tends to be driven into the axis of the spray cone to further enhance the desiccating action.

As stated, the mixture of dried material and gaseous heating medium then passes through the chamber 11, the former dropping into the bottom 12 of the casing 10 and the latter being withdrawn as hereinbefore set forth.

Means are indicated also for the disposal of the powdered material accumulating on the bottom 12, as in the provision of a scraper arm 30 extending substantially from the center to circumference of said bottom and mounted for rotation thereover on a shaft 31 projecting therethrough and driven by a pulley 32 thereon from a suitable source of power (not shown). Moreover, the said scraper arm is of a design having a portion 33 between its ends which is curved substantially to a semi-circle, the remaining portions converging gradually thereto from the respective ends. By this expedient, the powder on the bottom 12 is directed to the semi-circular portion 33 as said arm is swept over the bottom during its rotation. Bottom 12, moreover, is provided with an opening 34 therethrough and of diameter substantially equal to that of the semi-circular portion 33 of the scraper arm 30. It will be understood, therefore, that as said scraper arm portion 33 and the opening 34 register, the powder material will be delivered through the latter and discharged therefrom as into a valved hopper 35 or like device for finally withdrawing the powdered material.

I claim:

1. A spray drying apparatus, comprising a casing providing a desiccating chamber, a distributing casing secured to the top thereof for the heated gaseous medium, radially disposed guide vanes provided therein intermediate the periphery and center of the same to afford a circumferential distributing chamber, radial guide chambers and a central through-passage, and a spray nozzle associated therewith and having its orifice disposed above the top of said casing coaxially with its said central through-passage.

2. A spray drying apparatus, comprising a casing providing a desiccating chamber, a distributing casing secured to the top thereof for the heated gaseous medium, radially disposed guide vanes provided therein extending between the top and bottom walls of said casing intermediate the periphery and center of the same to afford a circumferential distributing chamber, radial guide chambers and a central through-passage, and a spray nozzle associated therewith and having its orifice disposed above the top of said casing coaxially with its said central through-passage.

In testimony whereof I affix my signature.

WILLIAM SPENCER BOWEN.